(12) United States Patent  
Comaniciu et al.

(10) Patent No.: US 7,508,979 B2  
(45) Date of Patent: Mar. 24, 2009

(54) SYSTEM AND METHOD FOR DETECTING AN OCCUPANT AND HEAD POSE USING STEREO DETECTORS

(75) Inventors: Dorin Comaniciu, Princeton Junction, NJ (US); Thorsten Köhler, Deuerling (DE); Binglong Xie, Bethlehem, PA (US); Ying Zhu, Monmouth Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 820 days.

(21) Appl. No.: 10/991,684

(22) Filed: Nov. 18, 2004

(65) Prior Publication Data

US 2007/0183651 A1    Aug. 9, 2007

Related U.S. Application Data

(60) Provisional application No. 60/524,428, filed on Nov. 21, 2003, provisional application No. 60/524,429, filed on Nov. 21, 2003.

(51) Int. Cl.  
*G06K 9/00* (2006.01)

(52) U.S. Cl. ............... 382/154; 382/103; 382/118; 382/159

(58) Field of Classification Search ............... 382/103, 382/104, 154, 118, 159  
See application file for complete search history.

(56) References Cited

U.S. PATENT DOCUMENTS

| | | | |
|---|---|---|---|
| 5,983,147 A | 11/1999 | Krumm | 701/45 |
| 6,154,559 A * | 11/2000 | Beardsley | 382/103 |
| 6,621,491 B1 * | 9/2003 | Baumrind et al. | 345/419 |
| 6,829,384 B2 * | 12/2004 | Schneiderman et al. | 382/154 |
| 6,937,745 B2 * | 8/2005 | Toyama | 382/103 |
| 6,959,109 B2 * | 10/2005 | Moustafa | 382/159 |
| 7,020,305 B2 * | 3/2006 | Liu et al. | 382/107 |
| 7,027,618 B2 * | 4/2006 | Trajkovic et al. | 382/107 |
| 7,043,056 B2 * | 5/2006 | Edwards et al. | 382/103 |
| 7,194,114 B2 * | 3/2007 | Schneiderman | 382/118 |
| 7,266,225 B2 * | 9/2007 | Mariani et al. | 382/118 |
| 7,379,559 B2 * | 5/2008 | Wallace et al. | 382/100 |
| 2002/0102024 A1 | 8/2002 | Jones et al. | 382/225 |
| 2004/0013286 A1 | 1/2004 | Viola et al. | 382/118 |
| 2004/0013304 A1 | 1/2004 | Viola et al. | |

(Continued)

OTHER PUBLICATIONS

Braathen et al., "3-D Head Pose Estimation From Video by Stochastic Particle Filtering", Proceedings of the 8th Annual Joint Symposium on Neural Computation, 2001.

(Continued)

*Primary Examiner*—Gregory M Desire

(57) ABSTRACT

A system and method for detecting an occupant and head pose using stereo detectors is disclosed. In the training stage, pairs of images taken simultaneously from a pair of stereo cameras are received and components in each pair of images are identified. Features are associated with each component and a value is associated with each feature. Among them, a subset of features with best discriminative capabilities is selected and forms a strong classifier for a given component in a pair of images. In the detection stage, the strong classifiers are used in the incoming image pairs to detect components. Identified components are used to detect occupants and head pose of the occupants. Stereo detection is combined with stereo matching in a systematic way to improve occupant detection and localization.

28 Claims, 7 Drawing Sheets

U.S. PATENT DOCUMENTS

| | | | |
|---|---|---|---|
| 2004/0037450 A1* | 2/2004 | Bradski | 382/103 |
| 2004/0234136 A1* | 11/2004 | Zhu et al. | 382/224 |
| 2004/0240708 A1* | 12/2004 | Hu et al. | 382/103 |
| 2005/0226471 A1* | 10/2005 | Singh et al. | 382/118 |
| 2005/0249401 A1* | 11/2005 | Bahlmann et al. | 382/159 |
| 2006/0088207 A1* | 4/2006 | Schneiderman | 382/159 |
| 2007/0159344 A1* | 7/2007 | Kisacanin | 340/576 |
| 2007/0183651 A1* | 8/2007 | Comaniciu et al. | 382/154 |
| 2008/0109397 A1* | 5/2008 | Sharma et al. | 707/1 |

OTHER PUBLICATIONS

Chen et al., "Head Pose Estimation Using Both Color and Feature Information", IEEE Int'l Conf. on Multimedia Computing and Systems, vol. I: 9697, 1999.

Comaniciu, "Nonparametric information fusion for motion estimation", Proceedings of the 2003 IEEE Computer Science Conf. on Computer Vision & Pattern Recog, pp. 59-66, 2003.

Gee et al., "Determining the gaze of faces in images", IVC, 12(10): 639-647, Mar. 1994.

Horprasert et al., "Computing 3-D Head Orientation From Monocular Image Sequence", Int'l Conf. on Face and Gesture Recognition, pp. 242-247, 1996.

Huang et al., "Facial Tracking With Head Pose Estimation in Stereo Vision", ICIP02, pp. 8333-836, 2002.

Kruger et al., "Efficient Head Pose Estimation with Gabor Wavelet Networks", Proc. British Machine Vision Conf., Bristol, UK, Sep. 12-14, 2000.

Kwong et al., "Learning support vector machines for a multi-view face model", BMVC99, pp. 503-512.

Li et al., "Multi-view face pose estimation based on supervised ISA learning", Proceedings of the Fifth IEEE Int'l Conf. on Automatic Face and Gesture Recog., 2002, pp. 1-6.

Li et al., "Support Vector Regression and Classification Based Multi-View Face Detection and Recognition", AFGR00, pp. 300-305, 2000.

Pentland et al., "View-based and modular eigenspaces for face recognition", Proc. Of IEEE Conf. on Computer Vision and Pattern Recognition, Seattle WA, Jun. 1994, pp. 1-7.

Ruddarraju et al., "Face Multiple Camera Head Pose Tracking", Proceedings of the 16th Int'l Conf. on Vision Interface, Halifax, Canada, 2003.

Sherrah et al., "Face distributions in similarity space under varying head pose", Image and Vision Computing 19 (2001) pp. 807-819.

Srinivassan et al., "Head pose estimation using view based eigenspaces", Proceedings of the 16th Int'l Conf. on Pattern Recognition, 2002, pp. 302-305.

K. Toyama, ""Look, Ma—No Hands!" Hands-Free Cursor Control with Real-Time 3D Face Tracking", Proc. Workshop on Perceptual User Interfaces, San Francisco, 1998, pp. 49-54.

Wei et al., "Head Pose Estimation Using Gabor Eigenspace Modeling", ICIP02, pp. 281-284.

Matsumoto et al., "Development of intelligent wheelchair system with face and gaze based interface", Proc. Int. Workhop in Robot and Human Interactive Communication, Sep. 18, 2001, pp. 262-267.

Yang et al., "Model-based Head Pose Tracking with Stereovision", Proc. 5th Int. Conf. on Automatic Face and Gesture Recognition, FGR '02, May 20, 2002, pp. 255-260.

Heisele et al., "Component-based face detection", Proc. Of the 2001 IEEE Comp. Soc. Conf. on Computer Vision and Pattern Recognition, CVPR 2001 IEEE Comput. Soc. Los Alamitos, CA, vol. 1, Sep. 10, 2001, pp. I 657-I 662.

Xie et al., "Component Fusion for face detection in the presence of heteroscedastic noise", Proc. Annual Conf. of the German Society for Pattern Recognition, DAGM '03, Sep. 10, 2003, pp. 434-441.

Bruske et al., "Head-pose estimation from facial images with subspace neural networks", Proc. Int'l Neural Network and Brain Conf., pp. 528-530, 1998.

Article entitled "Development of Intelligent Wheelchair System With Face and Gaze Based Interface", by Matsumoto Y. et al., Proc. Int. Workshop in Robot and Human Interactive Communication, Sep. 28, 2001, pp. 262-267.

Article entitled "Model-Based Head Pose Tracking with Stereovision", by Ruigang Yang et al., Proc. 5th Int. Conf. on Automatic Face and Gesture Recognition FGR '02, May 20, 2002, pp. 255-260.

Article entitled "Component-Based Face Detection", by Heisele B. et al., Proc. of the 2001 IEEE Comp. Soc. Conf. on Computer Vision and Pattern Recognition, CVPR 2001 IEEE Comput. Soc. Los Alamitos, CA, USA, vol. 1, Sep. 10, 2001, pp. I 657-I 662.

Article entitled "Component Fusion for Face Detection in the Presence of Heteroscedastic Noise", by Binglong Xie et al., Proc. Annual Conf. of the German Society for Pattern Recognition Dagm '03, Sep. 10, 2003, p. 434-441.

Article entitled "Face-direction estimating system using stereo vision", by Minagawa T. et al., Industrial Electronics, Control and Instrumentation, 997, IECON 97 23rd International Conference on New Orleans, LA, vol. 3, Nov. 9, 1997, pp. 1454-1459.

Article entitled "Finding Faces in Cluttered Scenes Using Random Labeled Graph Matching", by Leung T.K. et al., Computer Vision 1995, Proceedings, 5th International Conference on Cambridge, MA, Jun. 23, 1995, pp. 637-644.

Article entitled "Detection and Classification of Passenger Seat Occupancy Using Stereovision", by Devy M. et al., Proceedings of the IEEE Intelligent Vehicles Symposium 2000, pp. 714-719.

Article entitled "Computational Stereo", by Barnard S.T., et al., Computing Surveys USA, vol. 14, No. 4, Dec. 1982, pp. 553-572.

Article entitled "A Progressive Scheme for Stereo Matching"by Zhengyou Zhang et al., 3D Structure From Images-Smile 2000, pp. 68-85.

Article entitled "An Algorithm For Real-Time Stereo Vision Implementation of Head Pose and Gaze Direction Measurement", by Matsumoto Y. et al., Automatic Face and Gesture Recognition, 2000, Mar. 28, 2000, pp. 499-504.

* cited by examiner

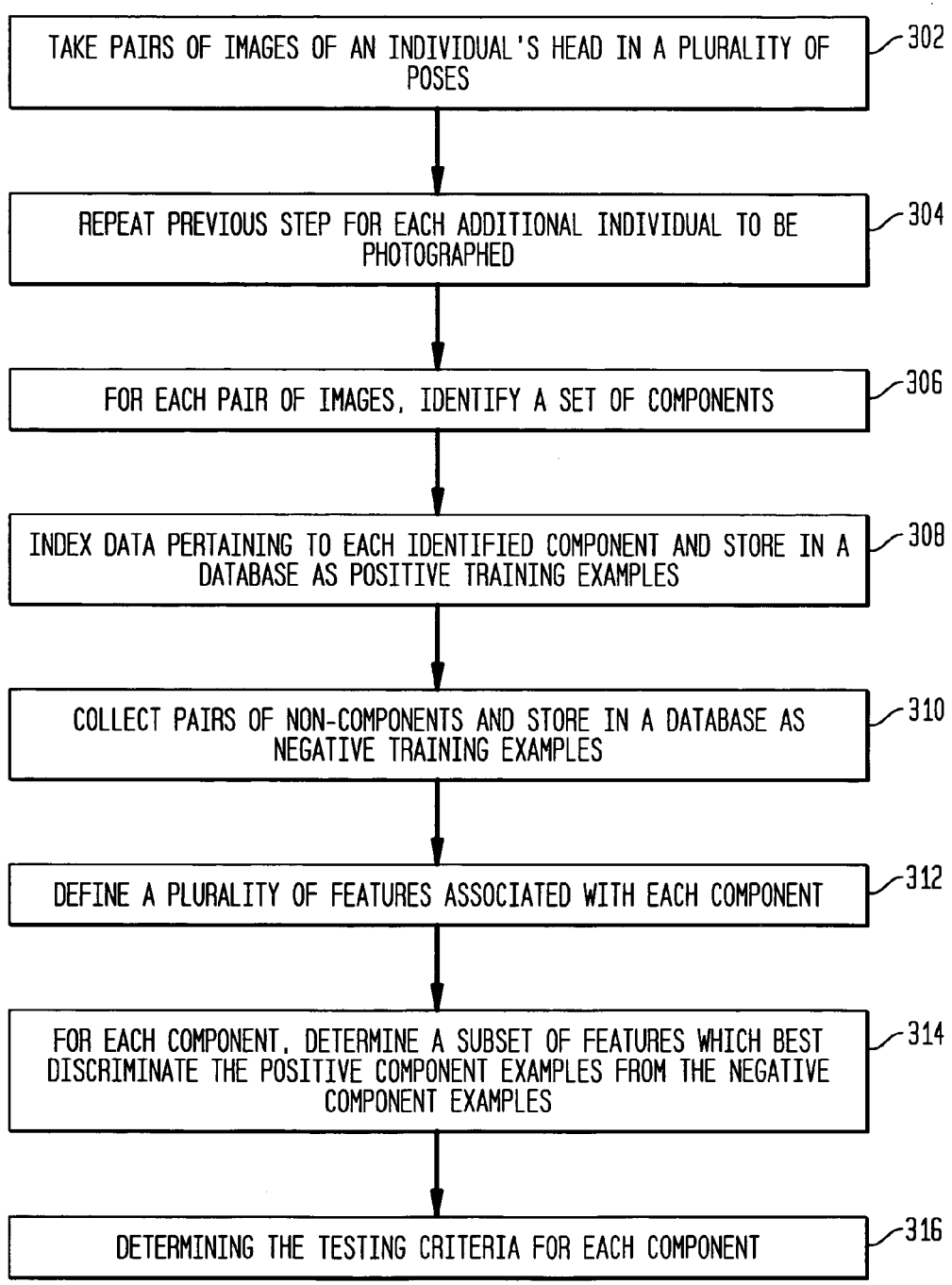

SYSTEM AND METHOD FOR DETECTING AN OCCUPANT AND HEAD POSE USING STEREO DETECTORS

CROSS REFERENCE TO RELATED APPLICATIONS

This application claims the benefit of U.S. Provisional Application Ser. No. 60/524,428, filed on Nov. 21, 2003 and U.S. Provisional Application Ser. No. 60/524,429, filed on Nov. 21, 2003, which are incorporated by reference in their entirety.

FIELD OF THE INVENTION

The present invention is directed to a system and method for detecting an occupant and head pose using stereo detectors, and more particularly, to a system and method for detecting an occupant and head pose by jointly training stereo detectors.

BACKGROUND OF THE INVENTION

Many recognition algorithms exist for detecting the presence of a person. In some cases only the face is detected; in other instances the person's whole body is detected. These detection algorithms can be used in a number of applications, such as, but not limited to, driver monitoring, user identification and for providing information about occupants of a vehicle. In the later instance, occupant detection and information about the occupant can be used to control aspects of a vehicle such as air bag deployment.

If the presence of an occupant can be detected, then an initial determination can be made as to whether an air bag needs to be deployed. An unoccupied seat does not require air bag deployment. Furthermore, if the size of the occupant and the position of the occupant relative to the dashboard can be ascertained, then the settings of the air bag can be adjusted to provide the appropriate amount of protection for the occupant. For example, if the occupant is a child or someone sitting close to the dashboard, the air bag can be adjusted to be deployed with a lower amount of force than for an adult or occupant sitting a reasonable distance from the dashboard.

In the case of driver monitoring, another useful application is the determination of the head pose of an occupant of a vehicle such as a driver. Information pertaining to head pose can be used to make assumptions regarding the state of the driver. For example, if the head is tilted, it may indicate that the driver is asleep or otherwise incapacitated. Or, if the head is turned, it can indicate that the driver is not being attentive to the road. Head pose estimation deals with finding the pose of the human head from one or more video streams. The problem is connected to face detection because if the location of the face is known, it becomes simpler to determine the pose. Likewise, if the pose is known, it is easier to detect the face. When two or more cameras are used, the fusion of information coming from different video streams represents a key source for head pose estimation.

The most common approaches for estimating head pose rely on feature point based methods, multi-view methods and three-dimensional (3D) modeling of the face. Feature point based method, also sometimes referred to as feature-based geometrical methods, try to locate landmark points on a face and compute the orientation of the face from the point locations. If a generic face model is assumed for all faces and face symmetry and ratio consistency are taken into consideration, pose can be estimated with only two-dimensional (2D) feature point information. Some methods use points near the eyes and mouth and the coplanar constraint of the points to estimate the pose. Another method uses only points from the areas near the eyes and a point on the nose tip.

Another approach involves multiple cameras to compute 3D landmark positions. The key problem is to accurately locate the feature points so as to minimize the correspondence error to build the accurate 3D positions. The feature point detection can be done with template matching, wavelet analysis or more involved detectors. While use of these methods allow for continuous pose estimation, the feature points are difficult to locate which can be compounded if a person's face is changing expressions. In addition, many times the techniques require manual initialization of the feature points.

Another approach commonly used to determine head pose is a multi-view based method. Multi-view based methods, which are also called appearance learning based methods, treat the whole face as a vector in a high-dimensional space and do not need to find feature points. Training face examples are collected in discrete views, for example, 0, 10, 20 yaw degrees, etc. Each view or pose has faces from different people and under different illumination conditions. The task is then simplified to a view classification problem. Various appearance learning methods can be used to discriminate the different views.

In some cases, a Support Vector Machine (SVM) is employed to classify the view. Other methods involve subspace transformations. In solving face recognition with wide pose changes, one approach detects the pose of the face first and then uses per-view eigenspaces to recognize the face. Principal Component Analysis (PCA) is applied to each view to get a per view eigenspace and then the incoming image is projected to each view's eigenspace and the view with the least residual error is taken as the estimated pose of the incoming face. Generally multi-view approaches do not require stereo information. However, these learning methods need a large training database with many pose-labeled examples.

Three-dimensional model based methods, also referred to as analysis by synthesis, normally assume a generic 3D face/head model. The incoming image is matched to the model in an iterative way to minimize matching error, while the model may or may not be adapted to the specific person. When the procedure converges, the pose is solved. Three-dimensional model based methods typically use many feature points. These methods also assume that the measured point locations are noisy when matching to the model iteratively, and therefore the methods are more robust. When the fitting procedure converges, the results are accurate. However these methods are computationally expensive and very slow and they can completely miss the target without good initialization.

SUMMARY OF THE INVENTION

The present invention is directed to a system and method for detecting head pose of an individual. A pair of images of a person is captured from a pair of stereo cameras. The pair of images is simultaneously scanned to locate at least one component in the pair of images. Three dimensional (3D) locations are computed for each of the at least one components. Head pose is estimated using the 3D locations.

In accordance with another aspect of the present invention, a system and method is disclosed for loading a database with trained stereo detectors for use in real-time head pose detection. Pairs of images of an individual's head are received in which each pair of images depicts a different head pose. Pairs of images of additional individuals' heads are also received in which each pair of images for each additional individual depict different head poses. A set of components is identified for each pair of images. Data pertaining to each identified component is indexed. The indexed data is stored in a database. A plurality of features are defined that are associated with each identified component. For each component, a subset of features are determined that best discriminate positive component examples.

In accordance with another aspect of the present invention, a system and method are disclosed for detecting an occupant of a vehicle. A pair of images of a person is captured from a pair of stereo cameras. Strong response positions are located in a first image of the pair of images. A corresponding region is located in a second image of the pair of images. A determination is made as to whether a head and shoulder component is detected. If a head and shoulder component is detected, the head and shoulder component are used as an initial matching point for stereo matching. Stereo matching is performed on the head and shoulder component to obtain correspondence information. The correspondence information is fed back to a detection module. The correspondence information is used to generate detection information. Correspondence information is continually fed to the detection module until convergence between the correspondence information and detection information is obtained. A determination is made as to whether an occupant is present based on the detection information.

BRIEF DESCRIPTION OF THE DRAWINGS

Preferred embodiments of the present invention will be described below in more detail, wherein like reference numerals indicate like elements, with reference to the accompanying drawings:

FIG. 3 is a flow chart depicting the steps for training the database with—stereo components used to detect head pose in accordance with the present invention;

DETAILED DESCRIPTION

Figure 1:
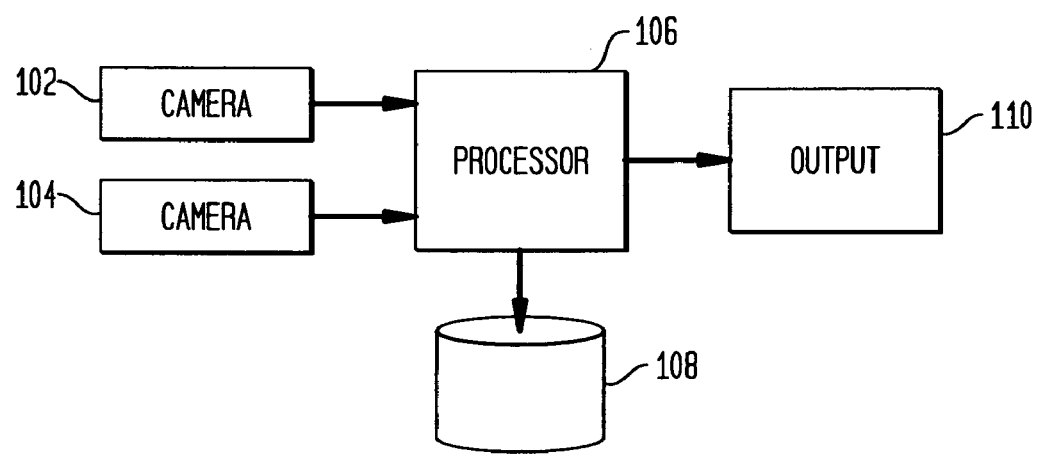
FIG. 1 is a system block diagram of a system for estimating head pose and/or detecting an occupant in a vehicle in accordance with the present invention.

The present invention is directed to a system and method for detecting an occupant and head position or pose of the occupant using stereo detectors. FIG. 1 illustrates a high level block diagram of a system for detecting occupant and head pose using stereo detectors in accordance with the present invention. Such a system may, for example, be used in a vehicle to detect the presence of a passenger or other information about the driver and/or passenger of the vehicle. It is to be understood by those skilled in the art that the present invention may be used in other environments such as surveillance or security applications.

The present invention exploits the correlation between any two stereo components captured by cameras 102, 104 as illustrated in FIG. 1. Stereo components are pairs of positive features detected by the system and used to determine both the presence of an occupant and head pose. Examples of stereo components include stereo images of left eye, right eye, nose, mouth, left ear, and right ear.

The stereo cameras 102, 104 are positioned at a known angle and position relative to one another and are directed to capture a particular target, e.g., a driver of a vehicle. By knowing the positional relationship between the two cameras 102, 104, the images captured by the cameras can be analyzed to detect a plurality of stereo components which may then be paired together based on the anticipated perspective of the particular stereo component relative to the view of each camera.

For example, if a driver is directly facing camera 102, a detected stereo component, e.g., the driver's nose, would appear in a frontal view. However, the image of the same stereo component, (nose) captured by camera 104 might appear as a profile view. By pairing the data for the stereo component together, one can determine the head pose of the driver. This data can be further analyzed to determine if further action needs to be taken. For example, if the data indicates that the driver is not being attentive to his driving, possibly because of being asleep or otherwise incapacitated, the processor 106 could trigger an alarm to be sounded to attempt to focus the driver's attention to the road.

Figure 2A:
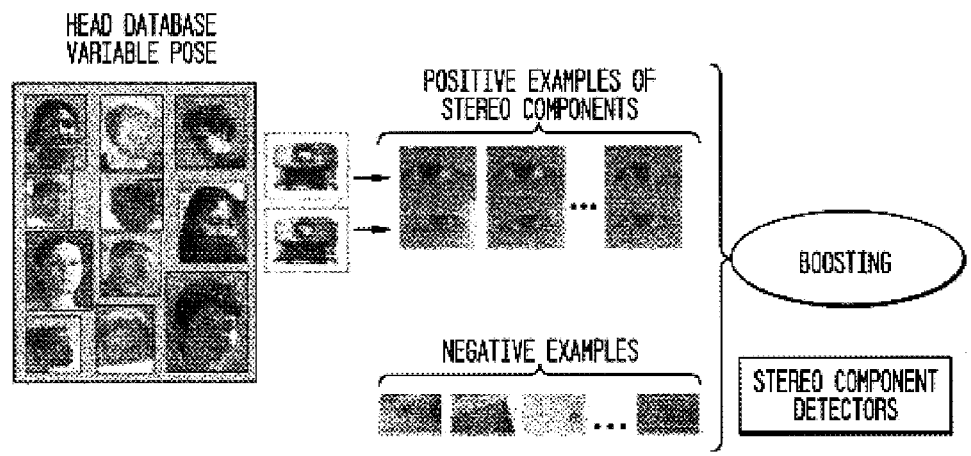
FIGS. 2a and 2b illustrate examples of images and stereo components collected during the learning phase of the system and during real-time detection in accordance with the present invention.
Figure 2B:
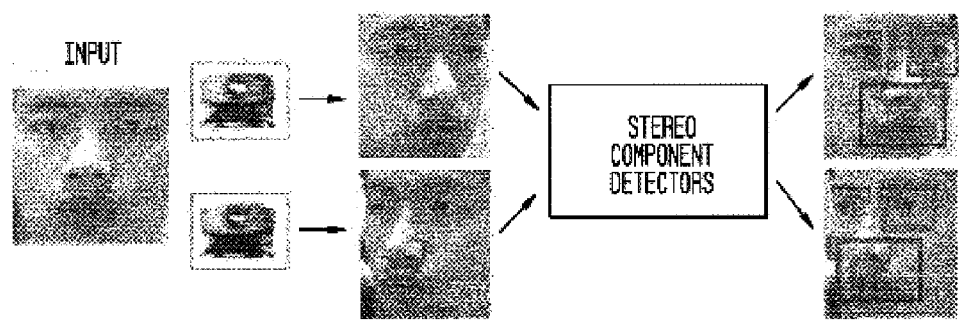

A database 108 of human heads with different poses is used to build positive examples of stereo components. The manifold of the positive examples capture jointly the appearance of the components and the intrinsic relationship between the stereo pairs. By exploiting the dependencies between the stereo components, this technique provides more reliable detection than the case when the two cameras are used independently. The database 108 is loaded with training data which is then used during real-time head pose detection. A learning technique such as boosting is employed by a processor 106 to build classifiers that are able to discriminate the positive pairs from negative examples. FIGS. 2a and 2b illustrate data that is gathered by processor 106 during the learning stage and images captured during real-time detection. The database 108 is loaded with trained classifiers which are used during real-time head pose detection. During the real-time detection, two video frames grabbed by the stereo cameras 102, 104 are searched for the stereo components specified during the training stage. By exploiting the dependencies between the stereo components, this technique provides more reliable detection than the case when the two cameras are used independently.

Figure 5:
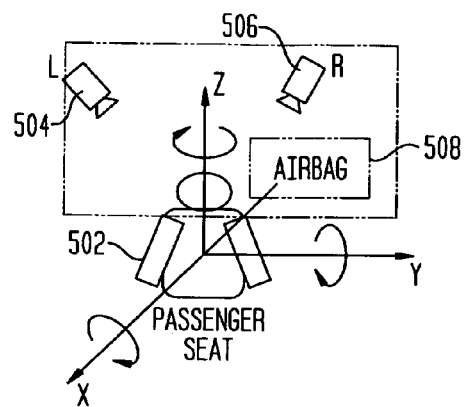
FIG. 5 is a schematic diagram illustrating a system for detecting an occupant in accordance with the present invention.

Referring to FIG. 3, a flow chart is shown which depicts the steps for training the database 108 in accordance with the present invention. Pairs of images are captured of an individual's head situated in a number of different head poses (step 302). It is required by the training stage to identify and index stereo components. A setup similar to that illustrated in FIG. 5 is used to capture the image pairs. It is to be understood by those skilled in the art that the cameras may be set up in an actual vehicle or may be simulated to mimic the location and relational placement of the cameras in a vehicle.

Figure 9:
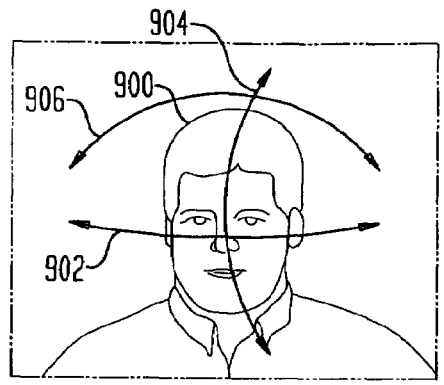
FIG. 9 illustrates an individual's head and the possible range of motion that is indicative of a particular head pose in accordance with the present invention.

Pairs of images (i.e., one image from each camera taken at the same time) of the individual's head are captured in a predetermined number and types of head poses. Head pose is defined by three general directions of motion as illustrated in FIG. 9. The first direction of motion is the yaw direction in which the head is turning around a vertical axis. Typically the 0° angle may be defined to be a frontal view (where the individual is directly facing the windshield of the vehicle. Each yaw angle of the head (e.g., between −90° and +90°) as illustrated by arrow 902 would signify a different pose.

A second direction of motion which is considered is the pitch of the head as indicated by arrow 904. The pitch corresponds to the rotation around the lateral axis. The reference 0° angle for pitch would be when head is facing forward. The pitch of the head (e.g., between −90° and +90°) would signify a different pose.

The third direction of motion which is considered is roll of the head as indicated by arrow 906. The direction of motion corresponds to the rotation around the longitudinal axis. The reference 0° angle corresponds to an upright face. The roll of the head (e.g., between −90° and +90°) would signify a different pose.

Once the pairs of images are taken for each desired pose of that particular individual, similar sets of images are taken of additional individuals (step 304). By this it is meant that for each individual, the same poses are imaged. After all of the training images have been captured and stored in database 108, each pair of images is analyzed to identify a set of stereo components (step 306). As described above, components are distinguishing features of the face such as the left eye, right eye, etc. The identification of the stereo components can be done manually by marking each component with a square as is shown in FIG. 2b.

When each pair of components is identified, the corresponding data associated with the component is indexed and stored in database 108 (step 308). The indexed data would include, among other things, the type of component and the head pose as defined by the three characteristics described above. Each pair of identified components is also referred to as a positive example. Once the positive examples have been identified, negative examples or non-components are collected and stored in the database (step 310). The non-components can be features of the head not identified to be a component or images of non-human objects.

With respect to the positive examples, a plurality of features are defined for each component pair (step 312). Typically each component may have, for example, 50,000 features associated with it. A value is associated with each feature to determine the strength of the feature with respect to its use to identify a component. The higher the value, the stronger the feature. Techniques such as boosting can be used to identify a subset of features which can be used to discriminate a positive example from a negative example (step 314). For example, if a component has 50,000 features, the subset may comprise 100-200 features. Once the subsets of features for each component have been identified testing criteria, or a strong classifier can be defined for each component (step 316).

Figure 10:
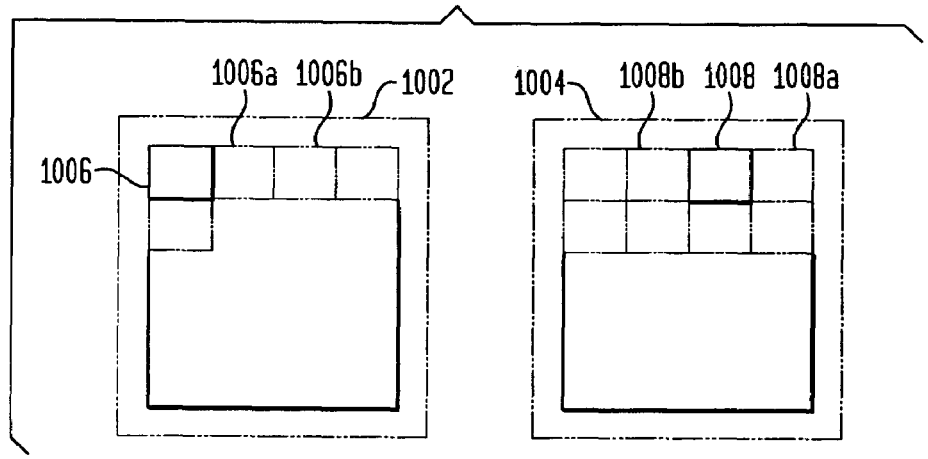
FIG. 10 illustrates a pair of images captured by two cameras and a method for identifying stereo components in the image pair in accordance with the present invention.
Figure 11:
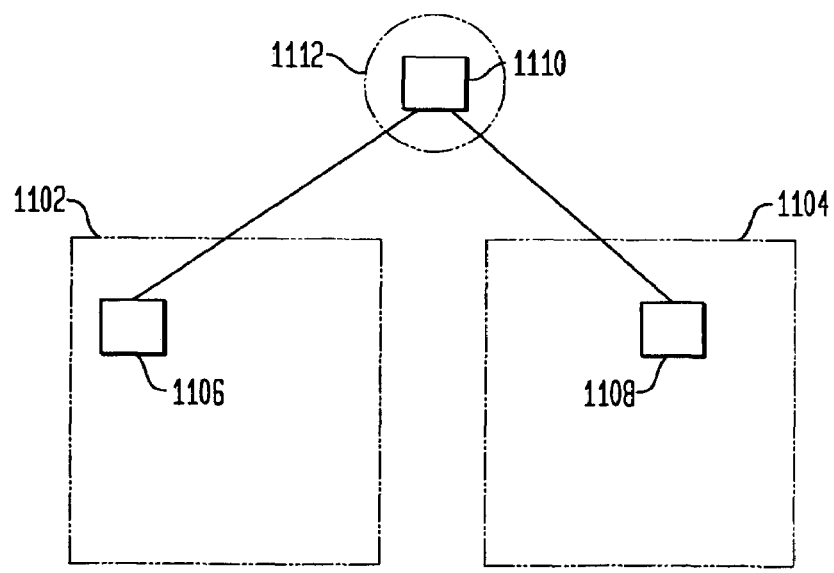
FIG. 11 is a schematic diagram illustrating the method for determining head pose in accordance with the present invention.

Testing is performed on each pair of images to identify positive examples or stereo components in the image pair. A window of a predetermined size is used to sample a portion of the pixels in the image as shown in FIG. 10. A window 1006 is placed in a first image 1002 and an algorithm is used to calculate a feature score corresponding to a particular component for the window. If the score is above a predetermined threshold, it is determined that the window contains the component (i.e., is a positive example). If the score is below a predetermined threshold, the window is determined not to contain the particular component. The window is slid by a small stepsize to an adjacent space 1006a and the feature score is again calculated. If a window indicates the presence of a particular component, a second window 1008 is placed in a second image 1004 of the pair to find the stereo component. The slid windows can overlap at adjacent locations.

A similar procedure is performed by the second window 1008 until a positive score is achieved. It is to be understood by those skilled in the art that constraints may be defined with respect to placement of the second window 1008 based on the component being evaluated. For example, if the component is the left eye, then once the component is identified in the first image 1002, the area of the second image 1004 which has to be searched is necessarily constrained because of the interrelationship of the two images. As such, if the left eye is located in the upper left quadrant of the first image, a known area in the second image can be determined in which the component is likely to be found. The use of constraints allows the present invention to significantly reduce the amount of computation that is required to identify stereo components.

It is to also be understood by those skilled in the art that different components have different constraints associated with them. The constraints are defined by both the characteristics of the components and the inter-relationships between the two images. Likewise once one component is identified, additional constraints may be applied to locate other components. For example, if the left eye is identified, constraints can be defined to assist in locating the person's nose.

As with the feature evaluation, the components are evaluated to determine which combination of components are the strongest discriminants for identifying head pose. The data associated with the strongest discriminants is stored in the database for use in real-time detection. These components are used in the detection phase to detect an individual's head in a real-time image and to determine the head pose. To compute the pose of the detected head, a second level of processing is involved where the responses of the first level stereo detectors for different face components are fused to estimate the face pose, e.g., using another learning algorithm.

Figure 4:
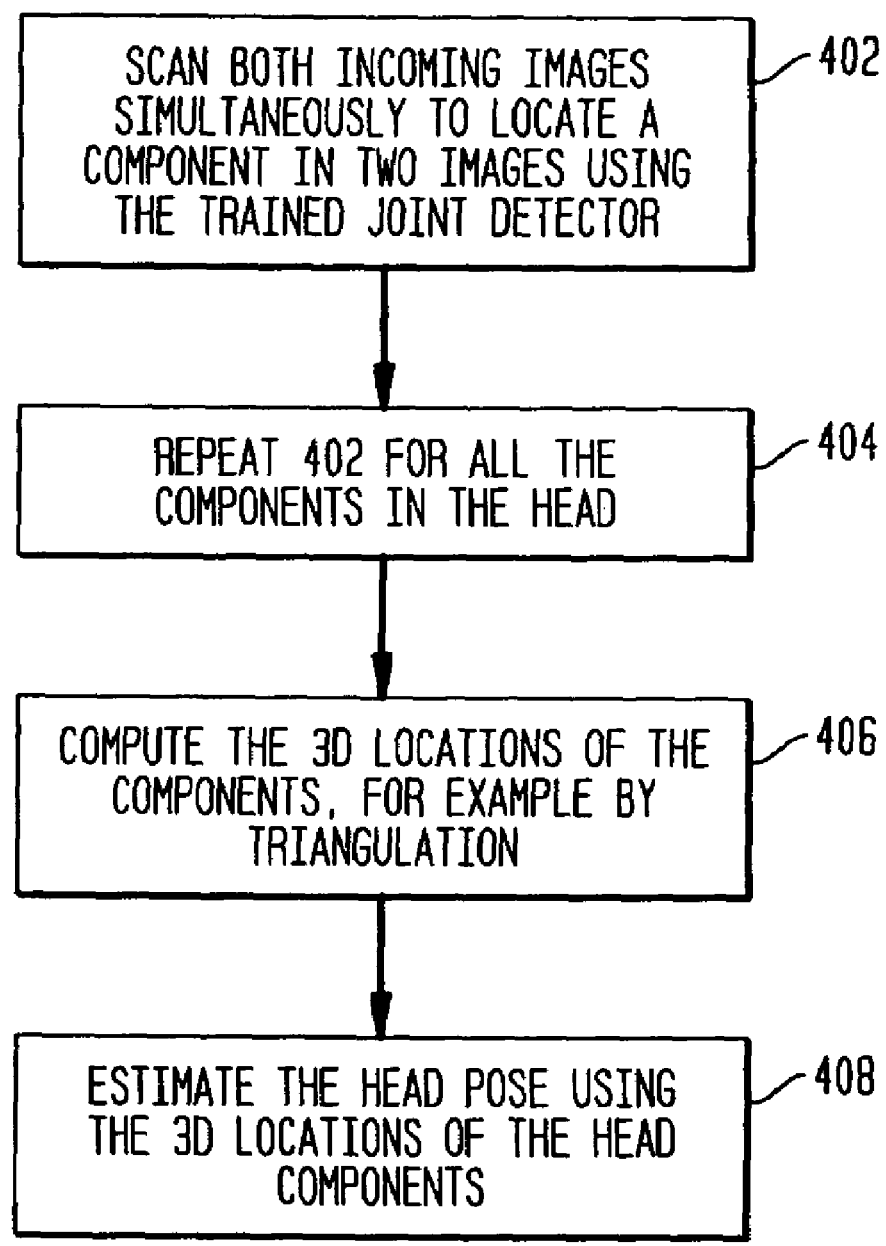
FIG. 4 is a flow chart depicting the steps for detecting head pose in accordance with the present invention.

Referring to FIG. 4, there is shown a flow chart that depicts the steps for detecting head pose in accordance with the present invention. For each pair of images captured by the pair of cameras located in a vehicle, the images are scanned by a window and feature scores are calculated in the manner described above to identify the subset of stereo components (step 402). Once the subset of components has been identified, the location of each component within a given image is determined (step 404).

FIG. 1 illustrates a schematic drawing of a pair of images 1102, 1104, and a pair of stereo components 1106, 1108 detected in the pair of images. The position of each component pair 1106, 1108 is triangulated to determine the actual position of the individual 1112 (step 406). Likewise, the triangulation provides the actual position of the particular component 1110. By determining the depth and location of the individual's head 1112, and the positioning of each of the detected components on the head 1112, the head pose of the individual can be determined (step 408).

In accordance with another embodiment of the present invention, a multi-view learning technique can be used to learn disparity maps associated with different poses of a face.

The disparity maps can be applied directly to intensity images; however, since the intensity images vary a lot with different illumination conditions and shadings, the learning is less effective. The benefit of learning on disparity maps is the robustness against lighting changes.

In the training stage, face disparity maps are obtained with known poses by rotating 3D face models to the desired views computationally or using live training data. The disparity map provides depth information with respect to an individual's components and provides data that can be used to determine the position of the individual's head as well as head pose. Disparity maps generated for each pair of images will identify components based on correlations of different surface points and the depth of those surface points. A learning technique, such as AdaBoosting, is employed to discriminate a view from all others. A set of different pose detectors suitable for their dedicated poses respectively is obtained.

In the detection stage, the disparity map is built in a coarse-to-fine manner. A possible way is to use a modified version of a multi-scale optical flow method to get the disparity map. Because the coarse head position is given in the disparity map, e.g., the head is closer to the camera than the background; the pose estimation is limited to a small searching area. The disparity map is fed into a bank of discrete pose detectors. The responses of the pose detectors are fused to get the pose estimation.

In addition to detecting head pose, the present invention is also directed to occupant detection based on joint training of stereo detectors. Such a technique can be used to detect a passenger of a vehicle and further to obtain information about a detected passenger that can be used, for example, to adjust air bag deployment. FIG. 5 illustrates an exemplary set up of a system for detecting occupant pose inside a vehicle. A pair of cameras 504, 506 is situated on either side of a potential occupant 502. The occupant can be the driver or a passenger in the vehicle. An airbag 508 is mounted in a dashboard (not shown) of the vehicle. The cameras 504, 506 capture images of the occupant.

Because the configuration of the cameras is known both relative to one another and relative to the position of the occupant 502, stereo images of the occupant can be collected and paired together to provide information about the occupant. Such information may include the presence of the occupant, the size of the occupant and the position of the occupant relative to the dashboard. Joint training is employed to encode the correlations between the stereo pairs of images into a component detector.

Using a pair of cameras, the correlation between the pair imposes additional constraints on an object class, e.g., occupant. To be more specific, the cameras 504, 506 may be configured in such a way that when a face appears in its frontal view in camera 504, camera 506 sees the face in a profile view. It is not possible for both cameras 504, 506 to observe profile views or frontal views at the same time. As such, the joint appearances are constrained by the camera setup. By processing the correlated appearances jointly, the performance of the separate appearance detectors is enhanced.

Figure 6:
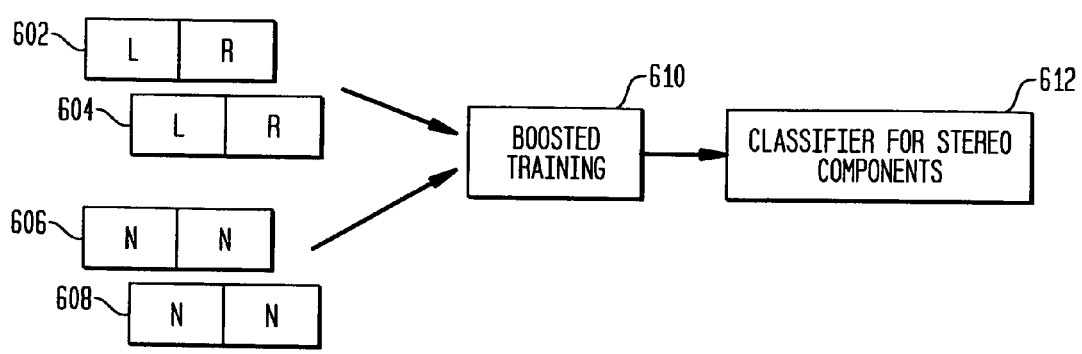
FIG. 6 is a block diagram that illustrates a method for jointly training a stereo detector in accordance with occupancy detection in the present invention.

The present invention is directed to a joint training method for learning stereo detectors from stereo examples and is illustrated in FIG. 6. Object examples 602, 604 are collected from stereo pairs of images. The feature set $X=X_L \cup X_R$ used in the joint boosted training is defined as the union of the feature sets $(X_L, X_R)$ extracted from (left, right) image pairs. Non-object examples or negative pairs 606, 608 are taken from non-occupant or background images. Given the camera configuration, some unlikely combinations of object appearances may be included in the negative examples as well to emphasize the constraints induced by the stereo setup.

Through boosted training 610, a stereo object detector is realized by the boosted classifier:

$$f(x_L, x_R) = \text{object or nonobject} \quad (1)$$

where $(x_L, x_R)$ are jointly selected features. The correlation between $X_L$ and $X_R$ is encoded in feature selection and decision combination. Since the boosted classifier linearly combines weak decisions, the final decision can be decoupled on the component level: $f(x_L, x_R) = f_L(x_L) + f_R(x_R)$, i.e. the processing can be carried out in one image and then proceeded to the other. In contrast to single camera detection, the term "components" refers to the appearance of the same object part observed by different cameras.

Figure 7:
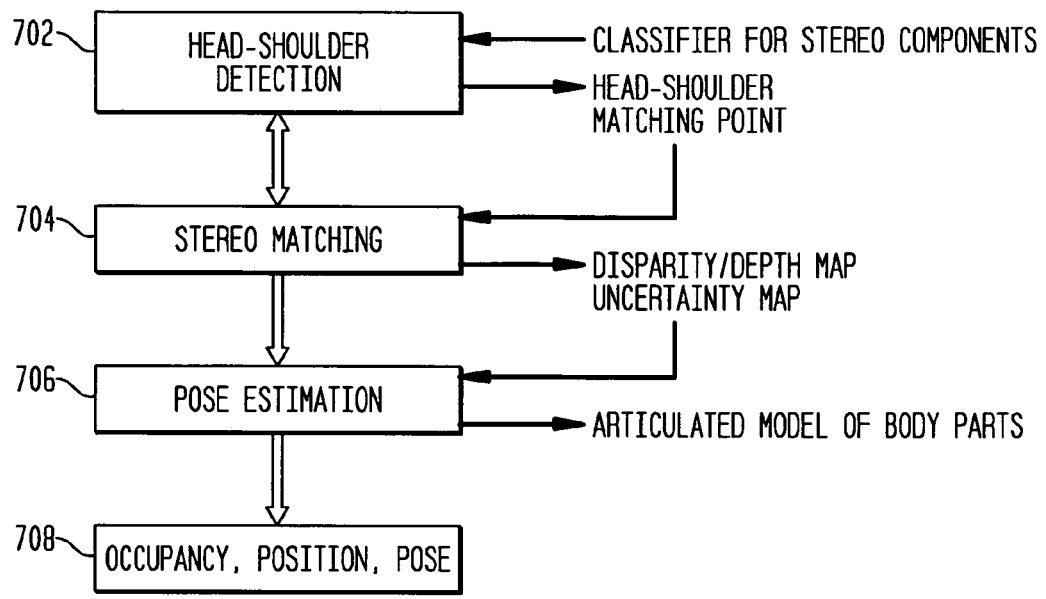
FIG. 7 is flow diagram for implementing a method for detecting an occupant and estimating the pose in accordance with the present invention.

In accordance with the present invention, FIG. 7 illustrates a flow diagram that depicts a method for performing occupancy detection and pose estimation. A stereo detector is used to identify passenger presence in a vehicle using head-shoulder detection. First, classifiers for stereo components are received by a stereo detector. The classifiers are compared to incoming object image pairs for detecting the presence of the head and shoulders of a passenger (step 702). In the upper part of the human body, the component defined by the head and shoulders contains the most discriminative information to classify passenger images from background images.

The stereo detector is used to locate the head-shoulder region for occupancy detection. To train the detector, stereo-image pairs of passenger images are collected that exemplify sufficient variations in pose, hair style, facial accessory, illumination and inter-person difference. The pairs of images of the head-shoulder regions are manually cropped and aligned to form the training data set. Through boosted training, a joint strong classifier is obtained that combines features from both images in a pair. Detection is then carried out in a serial fashion. First, strong response positions are located in one image. Next, the corresponding region is checked in the other image. The correspondence between the component location in both images is also learned from examples.

If a head and shoulders are detected, the corresponding head-shoulder images are used as initial matching points for stereo matching. Next, stereo matching 704 is performed which produces a disparity/depth map. The correspondence information obtained in stereo matching is then fed back to detection module to improve detection. The method iterates between stereo detectors and stereo matching until convergence in stereo detection and stereo matching. While the detection module provides good initialization for stereo matching algorithms, the correspondence of the head-shoulder region obtained by matching module induces useful constraints for the detection module. By allowing the interaction between the detection module and the matching module, both detection and matching results are further improved. Once the presence of a passenger is confirmed, the pose estimation module 708 detects other useful information such as body position and pose 710.

Figure 8:
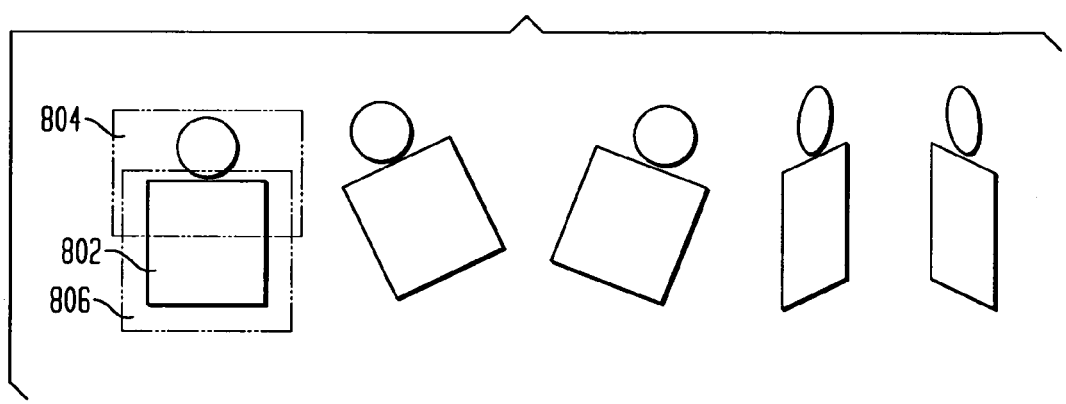
FIG. 8 illustrates an articulated body model in accordance with the present invention.

An articulated body model 802 as shown in FIG. 8 is used for determining pose estimation. The body model comprises two pieces: a head-shoulder piece 804 and an upper torso piece 806. The articulated body model 802 undergoes rigid movement such as rotation and translation in three-dimensional space. Focus is placed on a number of poses of interest. These poses should signal abnormal body positions that require cautious control on airbag deployment. For example, the poses of interest could include cases where the body is too close to the front end, the body is too small (e.g., a child) or the body is tilted.

A probabilistic approach is used to detect the poses of interest (POI). The appearance of a head and shoulder, the stereo correspondence as well as the disparity/depth map are measurements m, and the probability of the measurements caused by a POI is formulated by p(m|POI). With multiple poses of interest, it is modelled as multi-modality. Different pose estimation criteria can be adopted to determine the pose from the probability score p(m|POI). One example is the Maximum Likelihood (ML) estimation, where the particular pose that induces the maximum probability is decided as the body pose.

Having described embodiments for a method for detecting and tracking occupants and head pose, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting head pose of an individual comprises the steps of:
    capturing a pair of images of a person from a pair of stereo cameras;
    scanning the pair of images simultaneously to locate at least one component in the pair of images, wherein scanning comprises:
    using a window to analyze a section of each of the images,
    calculating a predetemined set of features and a classification score for the new window,
    determining if the classification score is above a predefined threshold,
    if the classification score is above the predefined threshold, determining that a component has been located, and
    if a feature score is below the predefined threshold, sliding the window in the image to an adjacent position and calculating a feature score in the adjacent position;
    computing three dimensional (3D) locations for each of the at least one component; and
    estimating head pose using the 3D locations.

2. The method of claim 1 wherein the pair of stereo cameras are positioned at a known angle and position relative to one another.

3. The method of claim 1 wherein the step of scanning the pair of images further comprises using a trained joint detector to scan the pair of images.

4. The method of claim 1 wherein the step of computing 3D locations comprises using triangulation.

5. The method of claim 1 wherein head pose is detected of an occupant of a vehicle.

6. The method of claim 5 wherein the occupant is a driver of the vehicle.

7. The method of claim 1 wherein the at least one component is left eye.

8. The method of claim 1 wherein the at least one component is a right eye.

9. The method of claim 1 wherein the at least one component is a nose.

10. The method of claim 1 wherein the at least one component is right ear.

11. The method of claim 1 wherein the at least one component is left ear.

12. The method of claim 1 wherein the at least one component is a mouth.

13. The method of claim 1 wherein the at least one component is a head.

14. The method of claim 1 wherein the at least one component is a shoulder.

15. The method of claim 1 wherein the computing step further comprises using disparity maps to determine the location of the at least one component.

16. The method of claim 1 wherein the step of scanning the pair of images further comprises discriminating positive pairs of the components from negative examples, wherein the negative examples are non-components.

17. A system for detecting head pose of an individual comprises:
    a pair of camera for capturing images of a person, the pair of cameras being situated in a known position relative to one another;
    a processor associated with the pair of cameras, the processor performing the following steps:
    i). simultaneously scanning the images captured by the pair of cameras to locate at least one component in the images, wherein scanning comprises:
    using a window to analyze a section of each of the images,
    calculating a feature score for the window,
    determing if the feature score is above a predefined threshold,
    if the feature score is above the predefined threshold, determining that a component has been located, and
    if a feature score is below the predefined threshold, sliding the window in the image to an adjacent position and calculating a feature score in the adjacent position;
    ii). computing three dimensional (3D) locations for each of the at least one components; and
    iii). estimating head pose using the 3D locations.

18. The system of claim 17 wherein the processor further comprises a trained joint detector to scan the images captured by the pair of cameras.

19. The system of claim 17 wherein the step of computing 3D locations comprises using triangulation.

20. The system of claim 17 wherein head pose is detected of an occupant of a vehicle.

21. The system of claim 20 wherein the occupant is a driver of the vehicle.

22. The system of claim 17 wherein the at least one component is a left eye.

23. The system of claim 17 wherein the at least one component is a right eye.

24. The system of claim 17 wherein the at least one component is a nose.

25. The system of claim 17 wherein the at least one component is right ear.

26. The system of claim 17 wherein the at least one component is a left ear.

27. The system of claim 17 wherein the computing step further comprises using disparity maps to determine the location of the at least one component.

28. The system of claim 17 wherein the step of scanning the pair of images further comprises discriminating positive pairs of the components from negative examples, wherein the negative examples are non-components.

* * * * *